United States Patent
Moloney et al.

(10) Patent No.: US 10,954,437 B2
(45) Date of Patent: *Mar. 23, 2021

(54) COMPOSITIONS AND METHODS FOR CORROSION INHIBITOR MONITORING

(71) Applicant: ChampionX USA Inc., Sugar Land, TX (US)

(72) Inventors: Jeremy Moloney, Katy, TX (US); Kousik Kundu, Houston, TX (US)

(73) Assignee: ChampionX USA Inc., Sugar Land, TX (US)

( * ) Notice: Subject to any disclaimer, the term of this patent is extended or adjusted under 35 U.S.C. 154(b) by 224 days.

This patent is subject to a terminal disclaimer.

(21) Appl. No.: 15/617,559

(22) Filed: Jun. 8, 2017

(65) Prior Publication Data
US 2017/0355902 A1    Dec. 14, 2017

Related U.S. Application Data
(60) Provisional application No. 62/348,375, filed on Jun. 10, 2016.

(51) Int. Cl.
*C09K 11/07*        (2006.01)
*C23F 11/14*        (2006.01)
(Continued)

(52) U.S. Cl.
CPC ............ *C09K 11/07* (2013.01); *C01B 32/194* (2017.08); *C09K 8/54* (2013.01); *C23F 11/08* (2013.01);
(Continued)

(58) Field of Classification Search
CPC ...... C09K 11/07; C09K 8/54; C09K 2208/10; C23F 11/1673; C23F 11/161;
(Continued)

(56) References Cited

U.S. PATENT DOCUMENTS

| | | |
|---|---|---|
| 3,436,373 A | 4/1969 | Cox et al. |
| 4,783,314 A | 11/1988 | Hoots et al. |

(Continued)

FOREIGN PATENT DOCUMENTS

| | | |
|---|---|---|
| EP | 0257876 A2 | 3/1988 |
| RU | 2579388 C2 | 4/2016 |

(Continued)

OTHER PUBLICATIONS

Pan et al., "Hydrothermal Route for Cutting Graphene Sheets into Blue-Luminescent Graphene Quantum Dots", Advanced Materials, 2010, vol. 22, No. 6, pp. 734-738.

(Continued)

*Primary Examiner* — Andrew J. Oyer
(74) *Attorney, Agent, or Firm* — Kagan Binder, PLLC

(57) ABSTRACT

Graphene quantum dots are functionalized by covalently bonding a corrosion inhibitor molecule thereto. In a useful method, a corrosion inhibitor compound is blended with a graphene quantum dot-tagged corrosion inhibitor compound, and the blend is applied to a metal surface, such as the interior of a carbon steel pipe. The blend inhibits corrosion arising from contact with produced water generated by hydrocarbon recovery from one or more subterranean reservoirs. The produced water having the blend dispersed therein is irradiated with a source of light having a selected first range of wavelengths, and the luminescent emission of the graphene quantum dot-tagged corrosion inhibitor is measured at a selected second range of wavelengths, thereby providing for real-time measurement of corrosion inhibitor concentration within the pipe.

11 Claims, 8 Drawing Sheets

◯ = GRAPHENE QUANTUM DOT

(51) Int. Cl.
    C09K 8/54      (2006.01)
    C23F 11/16     (2006.01)
    C01B 32/194    (2017.01)
    C23F 11/167    (2006.01)
    C23F 11/08     (2006.01)
    F16L 58/10     (2006.01)
    G01J 3/46      (2006.01)
(52) U.S. Cl.
    CPC .......... *C23F 11/141* (2013.01); *C23F 11/145* (2013.01); *C23F 11/149* (2013.01); *C23F 11/161* (2013.01); *C23F 11/162* (2013.01); *C23F 11/1673* (2013.01); *F16L 58/1009* (2013.01); *G01J 3/46* (2013.01); *C09K 2208/10* (2013.01)
(58) Field of Classification Search
    CPC ..... C23F 11/162; C23F 11/149; C23F 11/141; C23F 11/145; C23F 11/08; G01J 3/46; F16L 58/1009; C01B 32/194
    See application file for complete search history.

(56) References Cited

U.S. PATENT DOCUMENTS

| | | | |
|---|---|---|---|
| 5,702,684 | A | 12/1997 | McCoy et al. |
| 6,566,139 | B2 | 5/2003 | Davis et al. |
| 8,956,541 | B2 | 2/2015 | Elliott |
| 8,956,875 | B2 | 2/2015 | Kahaian et al. |
| 9,309,137 | B2 | 4/2016 | Moore et al. |
| 2011/0254432 | A1 | 10/2011 | Zeininger |
| 2014/0121350 | A1 | 5/2014 | You et al. |
| 2014/0158633 | A1 | 6/2014 | Holt |
| 2015/0041406 | A1 | 2/2015 | Xiao et al. |
| 2015/0280248 | A1* | 10/2015 | Tour ............... H01M 4/9083 502/180 |
| 2016/0097106 | A1 | 4/2016 | Robinson et al. |
| 2016/0108327 | A1 | 4/2016 | Pulikkathara et al. |
| 2016/0231247 | A1 | 8/2016 | Abla et al. |

FOREIGN PATENT DOCUMENTS

| | | | | |
|---|---|---|---|---|
| WO | 2014089214 | A2 | 6/2014 | |
| WO | 2015170124 | A1 | 11/2015 | |
| WO | 2015174996 | A1 | 11/2015 | |
| WO | WO-2015170124 | A1 * | 11/2015 | ........... C01B 32/186 |
| WO | 2016025051 | A2 | 2/2016 | |
| WO | 2016053711 | A1 | 4/2016 | |

OTHER PUBLICATIONS

Bacon et al., "Graphene Quantum Dots", Particle & Particle Systems Characterization, vol. 31 No. 4, 2014, pp. 115-428.
Karpicz et al., "Laser Fluorosensor for Oil Spot Detection", Lithuanian Journal of Physics, vol. 45, No. 3, 2005, pp. 213-218.
Xu et al., "How comb-type poly(maleic acid alkylamide-co-α-olefin) assemble in waxy oils and improve flowing ability", Asia-Pacific Journal of Chemical Engineering, vol. 4; pp. 551-556, 2009.
Andreev et al., "Laboratory assessment of corrosion inhibitors effectiveness at oilfield pipelines of West Siberian region. III. Bubble test", Int. J. Corros. Scale Inhib., vol. 2, No. 1, pp. 17-29, 2013.
Kelland, Malcolm A. "History of the Development of Low Dosage Hydrate Inhibitors", An American Chemical Society Journal, Energy & Fuels, vol. 20, No. 3, May/Jun. 2006, pp. 825-847.
Jin et al., "Tuning the Photoluminescence of Graphene Quantum Dots through the Charge Transfer Effect of Functional Groups", ACS Nano , vol. 7, No. 2, pp. 1239-1245, 2013.
Wu, et al., "Fabrication of highly fluorescent graphene quantum dots using L-glutamic acid for in vitro/in vivo imaging ans sensing", Journal of Chemistry C, 2013, pp. 4676-4684.
Hluchan, et al., "Amino acids as corrosion inhibitors in hydrochloric acid solutions", Materials and Corrosion, 39(11), Nov. 1, 1988, pp. 512-517.
Muhammad, et al., "The Use of Glutamic Acid as Corrosion Inhibitor for Aluminium in Hcl Solution", IOSR Journal of Applied Chemistry, 7(2), Mar.-Apr. 2014, pp. 50-62.
Zheng, et al., "Glowing Graphene Quantum Dots and Carbon Dots: Properties, Syntheses, and Biological Applications", retrieved from http://onlinelibrary.wiley.com/doi/10.1002/smll.201402648/epdf, Apr. 8, 2015, pp. 1620-1636.
International Search Report for International Application No. PCT/US2017/036540, dated Oct. 18, 2017 (6 pages).
Written Opinion for International Application No. PCT/US2017/036540, dated Oct. 18, 2017 (7 pages).
Bacon, et al., "Graphene Quantum Dots", Particle & Particle Systems Characterization, 31(4), Nov. 27, 2013, pp. 415-428.
Zhu, et al.,"Surface Chemistry Routes to Modulate the Photoluminescence of Graphene Quantum Dots: From Fluorescence Mechanism to Up-Conversion Bioimaging Applications", Advanced Functional Materials, 22(22), Nov. 21, 2012, pp. 4732-4740.
Sun, et al., "Highly Photoluminescent Amino-Functionalized Graphene Quantum Dots Used for Sensing Copper Ions", Chemistry—A European Journal, 19(40), Aug. 12, 2013, pp. 13362-13368.
International Search Report for International Application No. PCT/US2017/036545, dated Aug. 21, 2017 (6 pages).
Written Opinion for International Application No. PCT/US2017/036545, dated Aug. 21, 2017 (8 pages).
Layek, et al., "A review on synthesis and properties of polymer functionalized graphene", Polymer, 54(19), Aug. 1, 2013, pp. 5087-5103.
Song, et al., "Study on the relationship between the structure and activities of alkyl methacrylate-maleic anhydride polymers as cold flow improvers in diesel fuels", Fuel Processing Technology, 86(6), Mar. 25, 2005, pp. 641-650.
International Search Report for International Application No. PCT/US2017/036550, dated Aug. 3, 2017 (6 pages).
Written Opinion for International Application No. PCT/US2017/036550, dated Aug. 3, 2017 (7 pages).
Neises et al, "Simple method for the esterification of carboxylic acids", Angewandte Chemie International Edition, vol. 17, Issue 7, 1978, pp. 522-524.
Examination Report from Australian Application No. 2017277654, dated Jan. 22, 2021, 5 pages.

* cited by examiner

COMPOSITIONS AND METHODS FOR CORROSION INHIBITOR MONITORING

FIELD OF THE INVENTION

The present invention generally relates to compositions and methods for monitoring the concentration of corrosion inhibitors in water sources having petroleum products dispersed therein.

BACKGROUND

Water sources are injected into the earth and/or recovered from the earth during subterranean hydrocarbon recovery processes such as hydraulic fracturing (fracking) and tertiary oil recovery. In one or more such processes a water source called "injectate" is injected into a subterranean formation. Injectates include water and a selected amount of dissolved solids or solvents therein. In one or more such processes a water source called "produced water" is recovered, i.e. flows back from the subterranean formation and is collected. Produced water includes one or more of injectate, connate (native water present in the subterranean formation along with the hydrocarbon), sea water, and anywhere from about 0.001 wt % to as much as 95 wt % hydrocarbon liquids or solids entrained (dispersed, emulsified, or dissolved) in the produced water. One or more of the injectate and the produced water can include salts and/or other dissolved solids, liquids, or gasses that cause corrosion of the metal pipelines used to transport the water sources toward, into, out of, or away from a subterranean formation. As a result, almost all operators in the oil and gas industry employ corrosion inhibitors to reduce internal corrosion in metal pipelines contacted with produced water.

The physical and chemical properties of produced water vary considerably depending on the geographic location of the field, the geological formation with which the produced water has been in contact for thousands of years, and the type of hydrocarbon product being produced. Produced water properties and volume can even vary throughout the lifetime of a reservoir. If water flooding operations are conducted in connection with tertiary oil recovery, produced water properties and volumes vary even more dramatically as additional injectate is injected into the formation.

A suite of laboratory tests under simulated field conditions are conventionally conducted to identify corrosion inhibitor dosage to reach the operator's various performance requirements before field deployment. When used in the field, corrosion inhibitors are added to a pipe carrying an injectate or a produced water at a rate to initially target a laboratory determined concentration of corrosion inhibitor. Ideally, because of differences between the laboratory and field environments, the corrosion inhibitor addition rate is further optimized in the field based on corrosion monitoring, which is assumed to be representative of the system. The corrosion monitoring is further complemented with corrosion inhibitor residual analysis, that is, measurement of residual corrosion inhibitor concentration at the end of a pipe. However, in systems lacking means of corrosion monitoring, operators often rely solely on residual monitoring—particularly in the case of produced water—to ensure that the corrosion inhibitor concentration is within a targeted range.

Residual analysis of corrosion inhibitor concentration in produced water sources is conventionally conducted in the field using colorimetric techniques. Such field methods are advantageous in that results can be rapidly gained and appropriate corrosion inhibitor dose adjustment can be made fairly quickly. However, these approaches are unable to independently identify and quantify individual active components of corrosion inhibitors due to both the presence of more than one corrosion inhibitor, and/or the presence of one or more additives, and/or the presence of residual hydrocarbon products entrained in the produced water.

For greater accuracy and speciation, a sample can be sent to the laboratory for more advanced techniques such as liquid chromatography-mass spectrometry (LCMS) analysis. However, LCMS analysis takes much longer than simple colorimetric techniques employed in e.g. field monitoring.

Thus, improved residual analysis techniques for corrosion inhibitors are needed. Specifically, there is a need in the industry to provide compositions and methods for rapid corrosion inhibitor concentration measurement in injectate and produced water sources. There is a need for such compositions and methods to useful on-demand and in the field during subterranean hydrocarbon recovery processes. There is a need for such compositions and methods to provide rapid results that enable such measurements to be made in real time. There is a need for such compositions and methods to provide resolution of one or more distinct corrosion inhibitor species from other corrosion inhibitor species, from other additives present in the water source, and from hydrocarbon products entrained in the water. There is a need for non-polluting, nontoxic, environmentally friendly compositions for such purposes.

Fluorescence "tagging", that is, bonding a fluorescent molecule to a corrosion inhibiting molecule, is a potential method for providing such a means of quantifying a single species of corrosion inhibitor in a water source. In such an embodiment, an operator in the field could simply irradiate a water sample with a selected range of wavelengths of light, specifically within the excitation range known to cause fluorescence of the fluorescent tagged corrosion inhibitor, and measure the resulting amount of fluoresced light generated by the fluorescent tagged corrosion inhibitor. However, major roadblocks exist in implementing such imaging technologies due to the presence of intrinsic background fluorescence emitted by hydrocarbons entrained particularly in produced water. Further, fluorescent molecules selected have different photophysical properties that further can be significantly affected by bonding the fluorescent molecule to the corrosion inhibitor. In some cases, fluorescence is reduced below a useful level or is even destroyed by bonding a particular corrosion inhibitor to the fluorescent molecule.

SUMMARY OF THE INVENTION

Described herein is a composition comprising a graphene quantum dot having a particle size of about 2 nm to 20 nm; and a residue of a corrosion inhibiting compound covalently bonded to the graphene quantum dot, wherein the corrosion inhibiting compound is effective for inhibiting corrosion of a metal surface contacted with produced water. In embodiments, the corrosion inhibiting compound comprises one or more imidazoline, ammonium, alkylpyridine, phosphate ester, or thiol groups. In embodiments, the corrosion inhibiting compound is mercaptoethanol. In embodiments, the covalent bonding comprises a carboxyl or carboxamide group bonded to the graphene quantum dot and the corrosion inhibitor residue. In embodiments, the composition luminesces at a wavelength of about 600 nm to 700 nm when excited by light having a wavelength of about 500 nm. In embodiments, the particle size is about 2 nm to 10 nm. In embodiments, the metal surface is a carbon steel pipe interior surface.

Also described herein is a composition comprising a corrosion inhibiting compound effective for inhibiting corrosion of a metal surface contacted with produced water; and a graphene quantum dot having a particle size of about 2 nm to 20 nm and having a residue of the corrosion inhibiting compound covalently bonded thereto. In embodiments, the composition includes a solvent.

Also described herein is a composition comprising a produced water; a corrosion inhibiting compound effective for inhibiting corrosion of a metal surface contacted with produced water; and a graphene quantum dot having a particle size of about 2 nm to 20 nm and having a residue of the corrosion inhibiting compound covalently bonded thereto, wherein the total concentration of the corrosion inhibiting compound plus the graphene quantum dot is about 5 ppm to 5000 ppm by weight. In embodiments, the produced water comprises about 0.001 wt % to 95 wt % entrained hydrocarbon.

Also disclosed herein is a method of monitoring corrosion inhibitor concentration, the method comprising applying a corrosion inhibiting composition to a produced water to form a tagged water source, the corrosion inhibiting composition comprising: a corrosion inhibiting compound effective for inhibiting corrosion of a metal surface contacted with produced water; and a graphene quantum dot having a particle size of about 2 nm to 20 nm and having a residue of the corrosion inhibiting compound covalently bonded thereto, wherein the concentration of the graphene quantum dot in the tagged water source is at least 0.1 ppb by weight and the total concentration of the corrosion inhibiting compound and the graphene quantum dot in the tagged water source is about 5 ppm to 5000 ppm by weight; irradiating the tagged water source with a source of light having a selected first range of wavelengths; and measuring the luminescent emission of the tagged water source at a selected second range of wavelengths, wherein the measuring is carried out substantially contemporaneously with the irradiating. In embodiments, the second range of wavelengths is between about 600 nm and 700 nm. In embodiments, the second range of wavelengths is substantially a single wavelength; in embodiments, the wavelength is about 600 nm. In embodiments, the first range of wavelengths is substantially a single wavelength; in embodiments, the wavelength is about 500 nm.

DETAILED DESCRIPTION

Figure 1A:
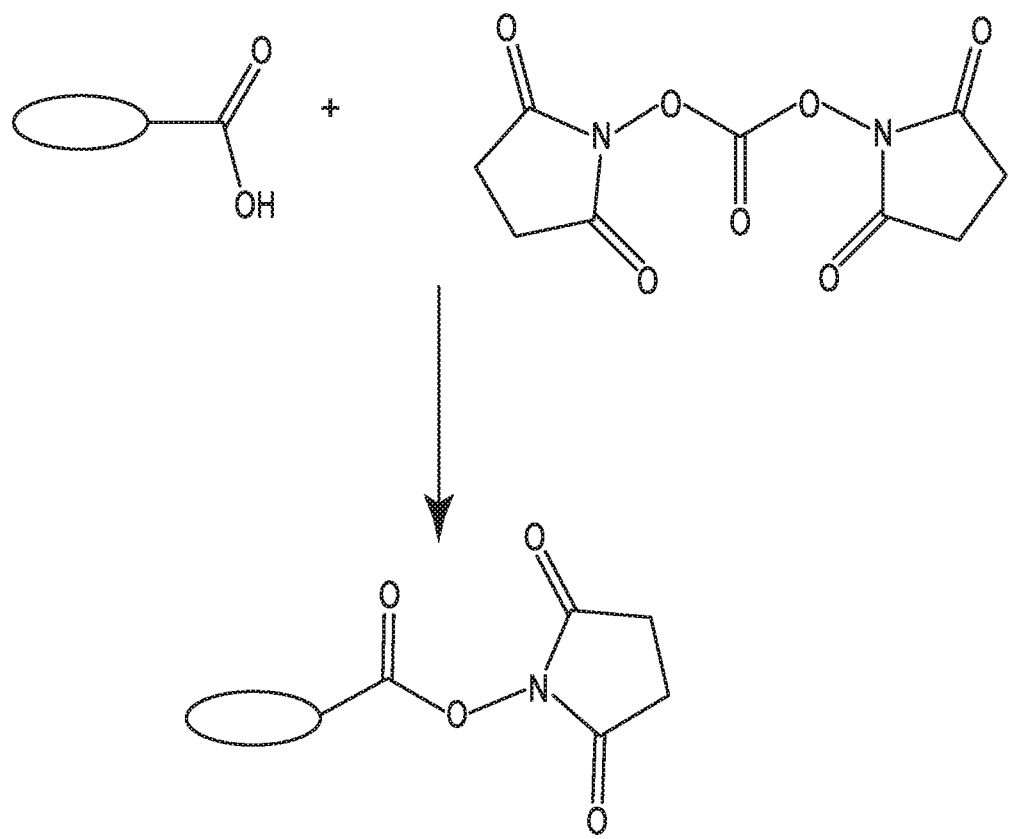
FIGS. 1A and 1B illustrate alternative synthetic schemes for compositions described herein.

Although the present disclosure provides references to preferred embodiments, persons skilled in the art will recognize that changes may be made in form and detail without departing from the spirit and scope of the invention. Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

As used herein, the term "water source" means an injectate or a produced water.

As used herein, the term "injectate" means water plus any solids or liquids dispersed therein that is injected into a subterranean formation for the purpose of inducing hydrocarbon recovery therefrom. Injectates optionally include salts, polymers, surfactants, scale inhibitors, stabilizers, metal chelating agents, corrosion inhibitors, paraffin inhibitors, and other additives as determined by the operator in a subterranean hydrocarbon recovery process. In some embodiments, an injectate includes or is sea water, brine, hard water, or waste water such as municipal waste water or gray water.

As used herein, the term "produced water" means water that flows back from a subterranean reservoir and is collected during a hydrocarbon recovery process including, but not limited to hydraulic fracturing and tertiary oil recovery. Produced water includes residual hydrocarbon products entrained therein and one or more of injectate, connate (native water present in the subterranean formation along with the hydrocarbon), brackish water, and sea water. Produced water ranges in temperature from about −30° C. to about 200° C., depending on the subterranean reservoir and the terranean environment and infrastucture proximal to the subterranean reservoir.

As used herein, the term "residual hydrocarbon products" means hydrocarbon liquids or solids entrained in produced water. As used in this context, the term "entrained" means dispersed, emulsified, or dissolved. Produced water having residual hydrocarbon products entrained therein includes between 0.001 wt % and 95 wt % residual hydrocarbon products, based on the total weight of the combined produced water and residual hydrocarbon products.

As used herein, the term "tagged water source" means a water source including one or more corrosion inhibitor compounds (CI) covalently bonded to one or more graphene quantum dots (GQD), or GQD-tagged CI, or "GQD-t-CI".

The terms "comprise(s)", "include(s)", "having", "has", "can", "contain(s)", and variants thereof, as used herein, are intended to be open-ended transitional phrases, terms, or words that do not preclude the possibility of additional acts or structures. The singular forms "a", "and", and "the" include plural references unless the context clearly dictates otherwise. The present disclosure also contemplates other embodiments "comprising", "consisting of" and "consisting essentially of", the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the word "substantially" modifying, for example, the type or quantity of an ingredient in a composition, a property, a measurable quantity, a method, a position, a value, or a range, employed in describing the embodiments of the disclosure, refers to a variation that does not affect the overall recited composition, property, quantity, method, position, value, or range thereof in a manner that negates an intended composition, property, quantity, method, position, value, or range. Examples of intended properties include, solely by way of non limiting examples thereof, rate, concentration, partition coefficient, solubility, temperature, and the like; intended values include yield, weight, concentration, and the like. The effect on methods that are modified by "substantially" include the effects caused by variations in type or amount of materials used in a process, variability in machine settings, the effects of ambient conditions on a process, and the like wherein the manner or degree of the effect does not negate one or more intended properties or results; and like proximate considerations. Where modified by the term "substantially" the claims appended hereto include equivalents to these types and amounts of materials.

Discussion

GQD-t-CI Compositions

In embodiments, a composition of the invention comprises, consists essentially of, or consists of one or more corrosion inhibitor compounds (CI) covalently bonded to one or more graphene quantum dots (GQD), or GQD-tagged CI, or "GQD-t-CI". In some embodiments, the GQD-t-CI produce fluorescence at excitation wavelengths (i.e. $\lambda_{max}$), emission wavelengths, or both that are substantially non-overlapping with characteristic $\lambda_{max}$ or emission wavelengths of various residual hydrocarbon products, thereby making it possible to monitor and trace individual corrosion inhibitor species in real time. In other embodiments, there is an amount of overlap between the emission wavelengths of one or more residual hydrocarbon products and the emissions wavelengths of the GQD-t-CI, because in embodiments the fluorescence spectra of hydrocarbon mixtures is very broad, and/or because of compositional variation in the hydrocarbon mixtures present in various produced waters. In embodiments where such an overlap in emissions spectra exists, background subtraction, use of a correction factor, or both is introduced to provide suitable correction to measured emission wavelengths.

A quantum dot is a nanometer-scale particle where excisions are confined in all three spatial dimensions. GQD are graphene fragments that are small enough to cause excision confinement and a quantum size effect. Typically, GQD have diameters of less than about 20 nm. Due to the fact that all graphene fragments exhibit quantum confinement effects, GQD have a non-zero bandgap and luminesce upon excitation. The bandgap is tunable by modifying the size and surface chemistry of the GQD. Overall, the spectroscopic properties of GQD vary depending on the method of preparation and/or functional groups bonded to the GQD at the edge(s) of the particles, and the size of the GQD.

The GQD useful in embodiments of the invention to form GQD-t-CI include those having an average particle size of about 1 nm to 10 nm, or about 2 nm to 10 nm, or about 3 nm to 10 nm, or about 4 nm to 10 nm, or about 1 nm to 9 nm, or about 1 nm to 8 nm, or about 1 nm to 7 nm, or about 1 nm to 6 nm, or about 1 nm to 5 nm, or about 1 nm to 4 nm, or about 2 nm to 8 nm, or about 2 nm to 7 nm, or about 2 nm to 6 nm, or about 2 nm to 5 nm, or about 2 nm to 4 nm, or about 3 nm to 5 nm, wherein "particle size" refers to the average diameter of the substantially two-dimensional GQD. The emission spectra of the GQD, including photoluminescence quantum yield decay lifetime, depends on the particle size of the GQD.

The GQD useful in the compositions and methods of the invention are made by either a "top down" or "bottom up" approach, as will be appreciated by one of skill. Top-down methods involve the decomposition and exfoliation of cheap, readily available bulk graphene-based materials, most commonly graphite, but require harsh conditions and often further require multiple steps involving concentrated acids, strong oxidizing agents, and high temperatures. A commonly employed top-down synthesis is called the Hummers method and involves exfoliation of graphite nanoparticles to form the single-layer GQD nanoparticles.

Bottom-up methods involve synthesis from polycyclic aromatic compounds or other molecules with aromatic structures such as fullerenes. Although complex, these methods allow for superior control of the properties and morphology of the final product compared to the top-down methods. In some of these methods, functional groups are added at the edge of the two-dimensional carbon "sheet" either inherently as part of the synthesis, or as a result of an extra step for this purpose. For example, Pan et al., *Adv. Mater.* 2010, 22, 734 employ hydrothermal cutting methodology involving an oxidation step in acidic conditions to result in development of epoxy moieties within a two-dimensional graphene sheet that ultimately are the sites of graphene sheet scission. The epoxy groups are further oxidized and yield carbonyl functionality at one or more sites present at the edges of the GQD formed by the scission process.

Other techniques to form functionalized GQD are known. Some representative currently known methods of GQD functionalization are discussed in Bacon, M. et al., *Part. Part. Syst. Charact.* 2014, 31, 415-428. GQD useful in the invention are functionalized either during or after synthesis of the GQD. Useful herein are GQD "edge-functionalized" with carboxyl, hydroxyl, thiol, or amino functionality. At the time of this writing, carboxyl-functional GQDs are the most commonly available functionalized GQD. However, as techniques for edge-functionalized GQD are developed, Applicant expects additional options for covalently bonding CI compounds to GQD to become available. By way of non-limiting example, conjugation reactions using e.g. maleimide chemistry, so-called "click" chemistries, amide formation using an activating compounds such as dicyclohexyl carbodiimide, and the like are examples of known suitable reaction schemes for covalently bonding CI compounds to GQD. Coupling reactions such those reported with the use of dicyclohexyl carbodiimide and the like are possible chemistries useful in functionalizing GQD with CI. In this spirit, Applicant considers additional GQD-t-CI to fall within the scope of this disclosure as being equivalents of the presently disclosed GQD-t-CI structures. That is, Applicant discloses herein GQD-t-CI represented by the formula "GQD-[linking group]-CI" where a linking group is any chemical functionality formed by the reaction of a functionalized GQD with a CI.

Attractive features or properties of GQD include the abundance of starting materials for synthesis thereof, non-toxicity of GQD, ease of preparation of GQD without relying on toxic precursors, excellent compatibility of GQD with aqueous media and components thereof, the availability of edge-functionalized GQD for forming the GQD-t-CI, and the ability to control $\lambda_{max}$ by adjusting the size of the GQD.

Corrosion inhibiting compounds (CI) commonly employed to treat injectate and/or produced water contain one or more of an imide, amino, quaternary ammonium, pyridinyl, phosphate ester or organic sulfur functionality. Such compounds include, for example, mercaptoethanol, imidazoline, fatty acid adducts of imidazoline, alkyl, aralkyl, or aromatic ammonium functional compounds such as those formed from the reaction of aniline and related amino-functional aromatic compounds with $C_6$ to $C_{20}$ alkyl halides, and phosphate esters formed by the reaction of ethylene oxide with $H_3PO_4$. Such corrosion inhibiting functionalities are covalently bonded to one or more GQD by employing the "edge functionality" imparted thereto as discussed above.

For example, a carboxy-functional GQD, termed "GQD-COOH" herein, is useful to show how covalent bonding to a CI functionality is accomplished. While esters, amides, and the like are capable of forming directly from GQD-COOH by esterification or amidation reactions such as any such reactions known by skilled artisans, it is often advantageous in terms of yield, reaction time, reaction temperature, or two or more thereof to provide a reactive intermediate capable of reacting with one or more reagents to more readily form the target GQD-t-CI.

Several reaction schemes are shown in the Figures. It should be understood that there are many variations of the reaction schemes shown, as will be appreciated by one of skill.

Figure 1B:
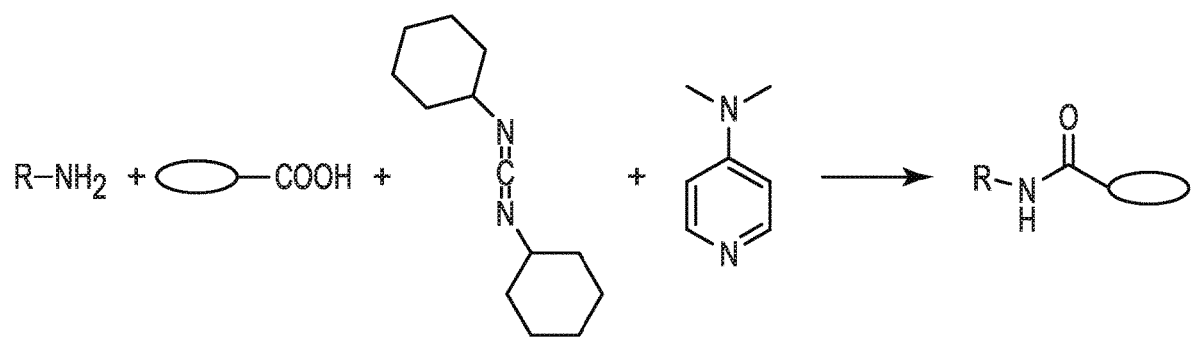

FIGS. 1A and 1B show one examples of "activating" reactions that are optionally employed to form an activated GQD, also termed "GQD*". One or more compounds are covalently bonded to one or more GQD by employing the "edge functionality" imparted thereto as discussed above, to result in one or more GQD-t-CI. For example, a carboxy-functional GQD, termed "GQD-COOH" herein, is exemplary in demonstrating how covalent bonding to form a fluorescent treatment compound is accomplished. In the case of FIG. 1A, a succinimide group is bonded to the COOH moiety, wherein the succinimide group is a good leaving group and the succinimide functionalized GQD is a GQD*. FIG. 1B shows another example of an activating reaction that may be employed to form a "GQD*" herein. In the case of FIG. 1B, the GQD* is formed as an intermediate that then proceeds to the final product during the course of a single-pot reaction. Thus, in FIG. 1B, N,N-dicyclohexylcarbodiimide (DCC) and a tertiary amine such as 4-dimethylaminopyridine (DMAP) are combined with GQD-COOH and an amino-functional group, R—NH$_2$, wherein R includes the corrosion inhibiting functionality to be bonded to the GQD. The result of the reaction is the formation of a GQD-t-CI, wherein GQD* is a chemical intermediate that is formed but not isolated from the single-pot reaction. Other such activating (leaving) groups will be readily envisioned and reactions to form such GQD* will also be readily envisioned, as will be appreciated by one of skill.

An "activated GQD" is a GQD functionalized with a group capable of leaving readily under a broad range of conditions in favor of CI functionality or functionality capable of forming a GQD-t-CI. A CI, or molecule capable of forming a CI, is reacted with the GQD-COOH or GQD* to result in a covalent bond between the GQD and the CI or CI-forming functionality. In some embodiments, one or more additional reactions are further carried out on the CI-forming functionality to form the GQD-t-CI; in other embodiments, the CI functionality is directly reacted with the GQD-COOH or GQD* to result in a GQD-t-CI.

Figure 2:
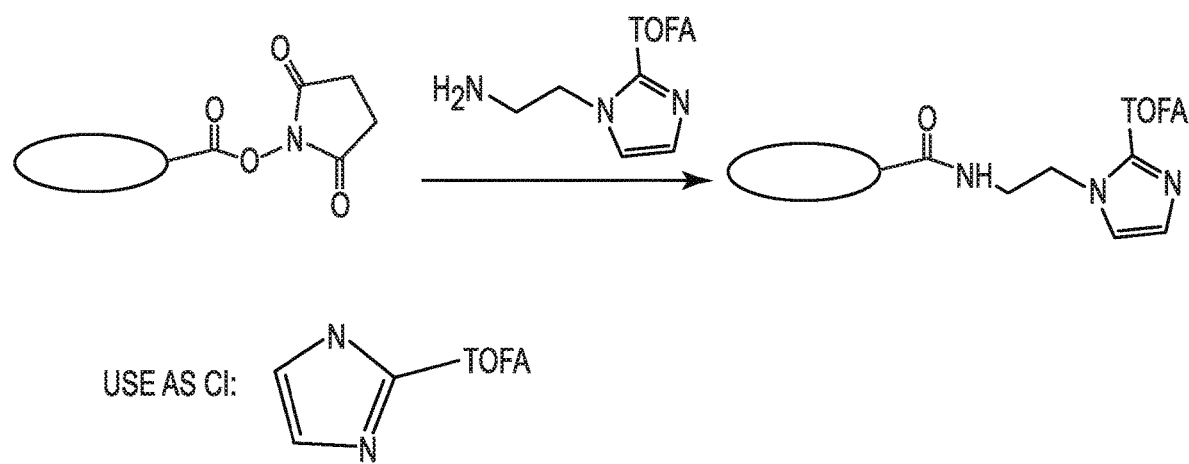
FIG. 2 illustrates a synthetic scheme for a corrosion inhibitor tagged graphene quantum dot.

Building on the reaction scheme involving the succinimide activation of the GQD to form a GQD*, FIG. 2 is a reaction scheme showing a GQD* reacted with an amino-functional CI. The CI is an adduct of tall oil fatty acid (TOFA, characteristic mixtures of C16-C18 fatty acids) and diethylenetriamine imidazoline. The adduct is commonly referred to as "TOFA/DETA", or alternatively by one or more similar terms of art such as "TOFA-DETA", "TOFA DETA", "TOFA/DETA imidazoline", "TOFA DETA imidazoline" or TOFA-DETA imidazoline". The TOFA/DETA adduct is further reacted with a carboxylic acid-functional GQD* to form GQD-t-TOFA/DETA, or "TOFA/DETA-GQD". The 2-aminoethyl moiety of TOFA/DETA is capable of displacing the succinimide group of the GQD* to result in this GQD-t-CI. The GQD-t-TOFA/DETA therefore includes a carboxamide group disposed between and bonded to both the GQD and the residue of the CI.

The TOFA group is one example of a fatty acid residue that is present in some embodiments on the CI residue; other fatty acids having linear, branched, or unsaturated hydrocarbon chains of 8 and 24 carbons are similarly useful as CI residues in the GQD-t-CI. The corresponding CI employed in an optional combination with the GQD-t-CI include diazole adducts functionalized with fatty acids, including TOFA, as shown in FIG. 2.

Figure 3:
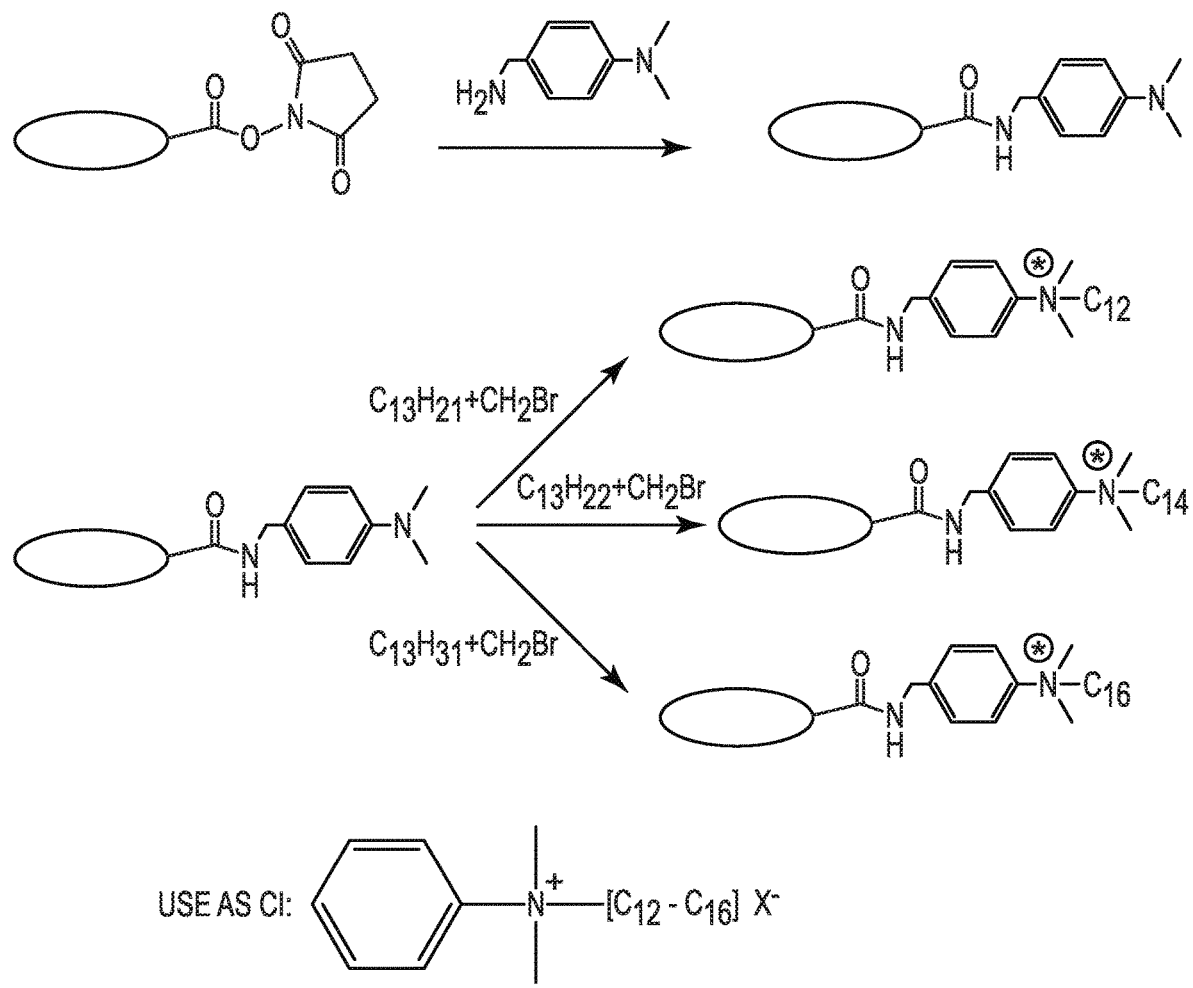
FIG. 3 illustrates a synthetic scheme for another corrosion inhibitor tagged graphene quantum dot.

FIG. 3 is a reaction scheme showing a GQD* reacted with an aminomethyl N,N-dimethylaniline compound to form an intermediate compound, that is, providing a group capable of forming a CI on the GQD. The GQD-t-CI therefore includes a carboxamide group disposed between and bonded to both the GQD and the residue of the CI. In a second step also depicted in FIG. 3, the dimethylamino group is further reacted with a $C_{12}$, $C_{14}$, or $C_{16}$ alkyl bromide to yield the corresponding ammonium bromide bonded to the GQD via the carboxamide linkage. The ammonium-functional compounds thus formed are GQD-t-CI. The $C_{12}$-$C_{16}$ moieties are exemplary but any linear, branched, or unsaturated hydrocarbon chains of 8 to 24 carbons are similarly useful as CI residues in the GQD-t-CI. The corresponding CI employed in an optional combination with the GQD-t-CI include ammonium compounds such as those shown in FIG. 3.

Figure 4:
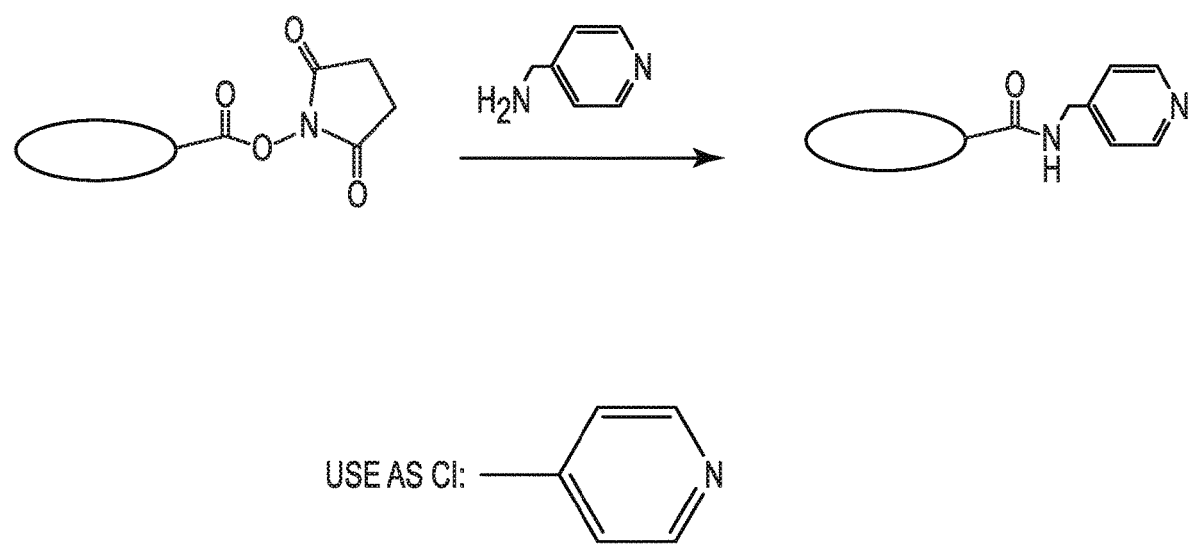
FIG. 4 illustrates a synthetic scheme for another corrosion inhibitor tagged graphene quantum dot.

FIG. 4 is a reaction scheme showing a GQD* reacted with 4-aminomethyl pyridine to yield the pyridinyl adduct of the GQD. The GQD-t-CI therefore includes a carboxamide group disposed between and bonded to both the GQD and the residue of the CI. The pyridine-functional compounds thus formed are GQD-t-CI. The corresponding CI employed in an optional combination with the GQD-t-CI include alkylpyridine compounds such as those shown in FIG. 4.

Figure 5:
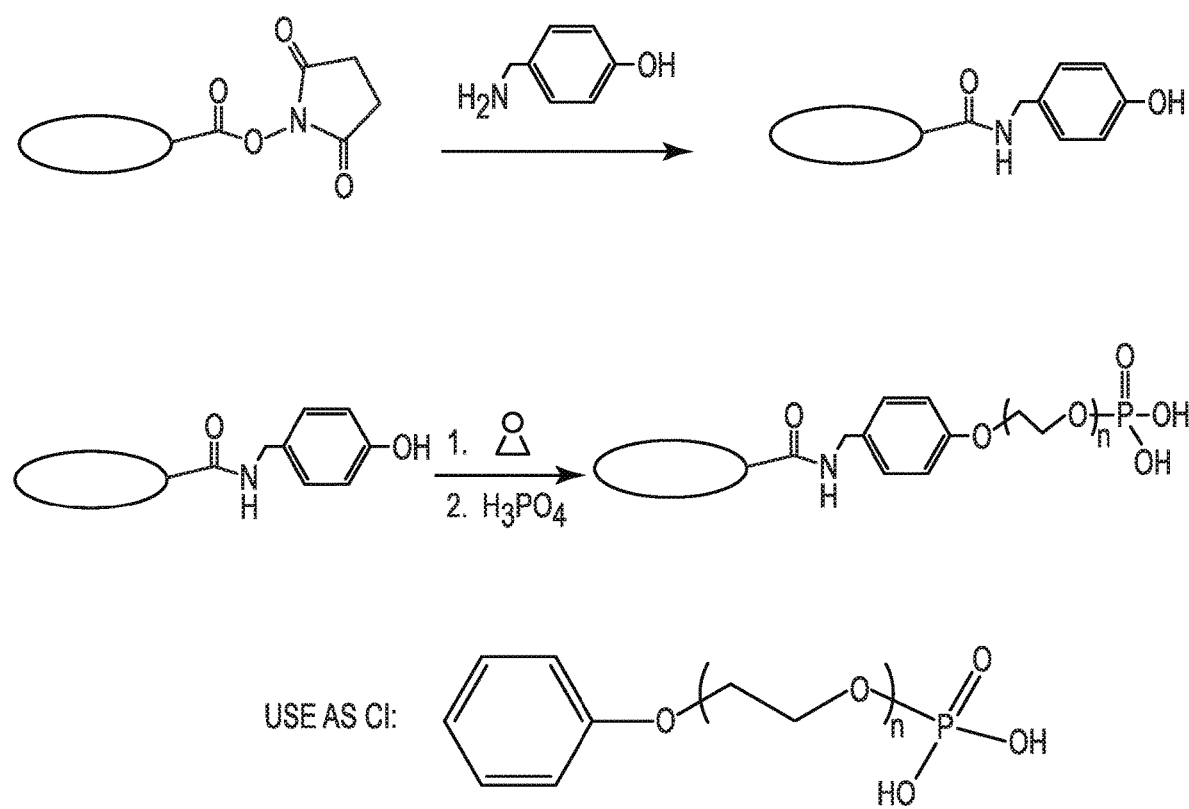
FIG. 5 illustrates a synthetic scheme for another corrosion inhibitor tagged graphene quantum dot.

FIG. 5 is a reaction scheme showing a GQD* reacted with 4-aminomethyl phenol to yield an intermediate compound. The GQD-t-CI therefore includes a carboxamide group disposed between and bonded to both the GQD and the residue of the CI. In a second step shown in FIG. 5, the residual phenolic hydroxyl group is further reacted with n moles of ethylene oxide to yield a polyoxyethylene moiety having n repeat units. Finally, the terminal hydroxyl group present on the polyoxyethylene moiety is reacted with $H_3PO_4$ to yield the corresponding phosphate ester adduct of the GQD. The phosphate ester adduct is a GQD-t-CI. The value of n is selected by the user, but is often about 1 to 100. The corresponding CI employed in an optional combination with the GQD-t-CI include oxyethylene phosphate ester compounds such as those shown in FIG. 5, wherein n is variable but in some embodiments is the same average number as employed in the GQD-t-CI. In some embodiments the oxyethylene phosphate ester compound employed as a CI includes no aromatic functionality.

Figure 6:
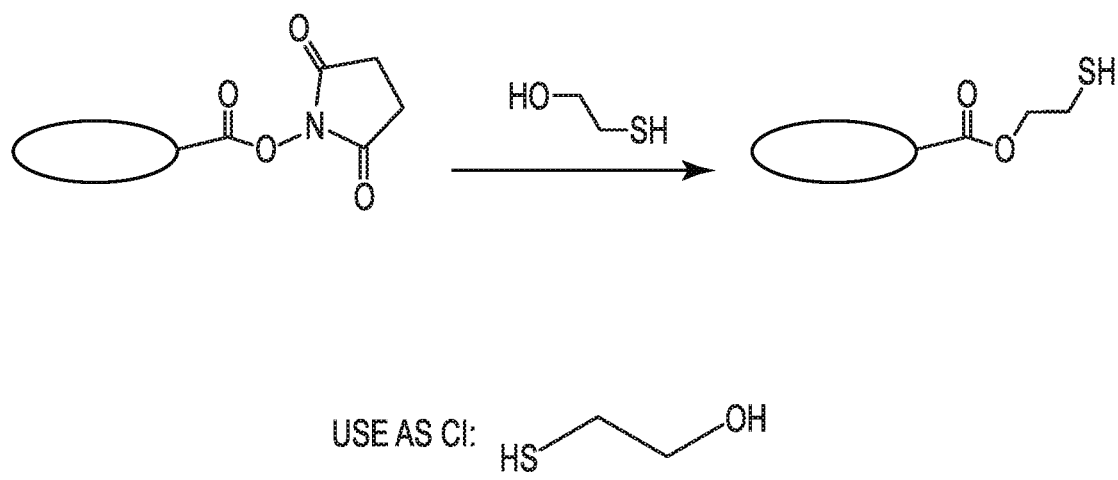
FIG. 6 illustrates a synthetic scheme for another corrosion inhibitor tagged graphene quantum dot.

FIG. 6 is a reaction scheme showing a GQD* reacted with mercaptoethanol to yield the mercaptoethyl adduct of the GQD. The GQD-t-CI therefore includes a carboxy ester group disposed between and bonded to both the GQD and the residue of the CI. The mercaptoethyl adduct is a GQD-t-CI. The corresponding CI employed in an optional combination with the GQD-t-CI includes mercaptoethanol, as shown in FIG. 6.

Compositions Including a GQD-t-CI

In embodiments, a composition of the invention is a blend of a GQD-t-CI and the corresponding CI in a weight ratio of GQD-t-CI:CI of about 1:1 to $1:1 \times 10^4$. The CI applied is a CI having substantially the same structure as the CI residue bonded to the GQD as described above. That is, the GQD-t-CI is the reaction product of the CI employed in the blend and a functionalized GQD or an activated GQD (GQD*). A lower quantum yield of the GQD-t-CI results in a higher GQD-t-CI ratio needed for conducting the measurements, in some embodiments.

Additives or adjuvants such as solvents, polymers, surfactants, oils, stabilizers, scale inhibitors, paraffin inhibitors, metal complexing agents, and the like are optionally added to the blend of GQD-t-CI and CI as determined by the operator in conjunction with the needs of the specific metal pipes and other equipment that contact produced water during one or more hydrocarbon recovery operations.

In some embodiments, the blend of GQD-t-CI and CI is a concentrate, wherein the total concentration of GQD-t-CI and CI in the concentrate is about 0.1 wt % to 98 wt %. In some embodiments, one or more components such as solvents, polymers, surfactants, oils, stabilizers, scale inhibitors, paraffin inhibitors, metal complexing agents or other components suitable for combining with produced water are included in the concentrate, as will be appreciated by one of skill. Where the one or more components of the concentrate include solvent, the solvent is present generally at about 10% to 99.9% by weight of the concentrate. The concentrate is applied to a metal pipe or other equipment or containment contacted by produced water and in need of corrosion inhibition at a targeted CI concentration.

The GQD-t-CI is thus applied to a water source to form a tagged water source. The GQD-t-CI is suitably applied alone or as a blend with CI. The GQD-t-CI is further suitably applied as a concentrate of GQD-t-CI or a blend of GQD-t-CI and CI. After or contemporaneously with the applying, the GQD-t-CI, alone or as a blend with CI and/or as a concentrate is diluted by contact at least with a water source to form a tagged water source. The amount of combined GQD-t-CI and CI in the tagged water source is sufficient to provide corrosion inhibition of the metal surfaces contacted with the tagged water source. The amount of GQD-t-CI in the tagged water source is sufficient to measure the concentration thereof downstream from a point of applying, according to the methods discussed in detail below. Where the tagged water source includes both GQD-t-CI and CI, the measurement of GQD-t-CI according to the methods below can be used to calculate the total concentration of GQD-t-CI plus CI in the tagged water source.

In embodiments, a composition of the invention is a tagged water source. The tagged water source comprises or consists essentially of a water source comprising one or more entrained hydrocarbon compounds, a corrosion inhibiting compound (CI), and a residue of a corrosion inhibiting compound covalently bonded to a graphene quantum dot (GQD-t-CI). In some embodiments, the CI present in the tagged water source is a compound having substantially the same chemical structure as the CI bonded to the GQD. Stated differently, in some embodiments the GQD-t-CI contains a residue attributable to the CI employed in the tagged water source. A representative example of a CI suitable to accompany each of the GQD-t-CI in FIGS. 2-6 is shown below each reaction scheme ("Use as CI: . . . ").

In embodiments, by employing GQD-t-CI containing a residue attributable to the CI employed in the tagged water source, the aqueous solubilities of the CI and GQD-t-CI are caused to be similar. Assuming good mixing of the GQD-t-CI/CI blend with the water source and no preferential adsorption of one of these species on surfaces contacted by the tagged water source, the CI and the GQD-t-CI are expected to be present in the tagged water source at substantially the same molar ratio as the molar ratio of these two compounds applied to the water source, no matter where a measurement is made. In some embodiments, the tagged water source is exclusive of the CI. In some such embodiments, the tagged water source includes substantially only the GQD-t-CI and the water source; in other embodiments, one or more non-CI components, adjuvants or additives (as those terms are defined above) are also present in the tagged water source. However, for cost purposes it is often advantageous to include a blend of the CI and the GQD-t-CI in the tagged water source, relying on a consistent ratio of the two materials downstream from a point of applying that is the same or substantially the same as the molar ratio of the materials applied to the water source.

The GQD-t-CI of the invention works within the tagged water source as a marker or tag, that is, a measurement means to determine the total amount of CI in the tagged water source, wherein the total amount of CI is the amount of CI plus GQD-t-CI present. The total amount of CI is determined by first determining the quantum yield and emission spectrum of the GQD-t-CI (that is, the characteristic wavelengths and intensity of luminescence generated by exciting the GQD functionality with a selected wavelength of light) at a selected wavelength, for example $\lambda_{max}$ (wavelength of maximum adsorption by the GQD-t-CI), then applying an amount of the GQD-t-CI along with the CI in a known ratio to a water source such as an injectate or produced water. The amount of CI is then determined at any point in the flow of the tagged water downstream from the applying by exciting the tagged water source with the selected wavelength of light and measuring the intensity of a characteristic emission wavelength.

The $\lambda_{max}$ of many GQD-t-CI species is about 300 nm to 550 nm, for example about 350 nm to 550 nm, or about 400 nm to 550 nm, or about 450 nm to 550 nm, or about 500 nm to 550 nm, or about 300 nm to 500 nm, or about 300 nm to 450 nm, or about 300 nm to 400 nm, with peak emission intensity of these species occurring between about 500 nm to 700 nm, or about 550 nm to 700 nm, or about 600 nm to 700 nm, or about 500 nm to 650 nm, or about 500 nm to 600 nm. The "red shift" of excitation to peak emission intensity wavelengths is often about 50 nm to 200 nm, or about 50 nm to 150 nm, or about 50 nm to 100 nm, or about 100 nm to 200 nm, or about 100 nm to 150 nm.

The emission, i.e. luminescence spectra of GQD-t-CI highlights a surprising and highly advantageous property of GQD in produced water: the GQD-t-CI emission can be easily separated from the emissions of the various hydrocarbon compounds entrained in a produced water. Karpicz, R., et al., *Lithuanian J. Physics* (2005) 45: 213-218 report the peak emission wavelengths of crude oils to be in the range of about 500 nm to 550 nm in many instances, with some refined petroleum products having peak emission intensity somewhat lower than this (e.g. 375 nm-450 nm). We have also conducted emissions experiments with crude oil and condensates thereof, and have found that using $\lambda=500$ nm as the excitation wavelength, the emissions intensity peak occurs at about 550 nm, with very low intensity emission at about 575 nm. The peak emission intensity of the GQD-t-CI is thus easily differentiated from the "background" emission of the crude oil hydrocarbon products entrained in produced water: by selecting a GQD-t-CI with a peak emission intensity at about 600 nm, for example, concentration of the GQD-t-CI in produced water is easily measured in the presence of the entrained hydrocarbon.

Depending on the quantum yield of the GQD-t-CI, a selected amount of GQD-t-CI is applied to a produced water along with untagged (not bonded to a GQD) CI in a molar ratio of GQD-t-CI:CI of about $1:1\times10^{11}$ to 100:1 to produce a tagged water source. In embodiments, the CI applied is a CI having substantially the same structure as the CI residue bonded to the GQD-t-CI. In embodiments, a higher quantum yield of the GQD-t-CI results in a lower GQD-t-CI:CI ratio required for conducting the measurements. In embodiments, the quantum yield of a GQD-t-CI is determined, and then a blend of GQD-t-CI and CI is blended to target both a total concentration of the combined species and a concentration of GQD-t-CI suitable for the measurement system employed to measure GQD-t-CI concentration in the tagged water source.

The concentration of conventional CI applied to a water source that is an injectate or a produced water is about 5 ppm to 5,000 ppm by weight. The concentration of GQD-t-CI employed in a tagged water source is at least about 0.1 ppb by weight and can be as much as 10,000 ppm by weight where the GQD-t-CI is used substantially alone, that is, where it is not blended with CI. In embodiments, the concentration by weight of GQD-t-CI employed in a blend with CI is targeted to provide about 0.1 ppb to 500 ppm GQD-t-CI by weight, or about 1 ppb to 250 ppm, or about 5 ppb to 100 ppm, or about 10 ppb to 50 ppm, or about 50 ppb to 10 ppm of the GQD-t-CI by weight in the tagged water source; and further to provide a total concentration of GQD-t-CI and CI of about 5 ppm to 5000 ppm by weight in the tagged water source.

Concentrates comprising blends of GQD-t-CI and CI are thus formulated to target both a total GQD-t-CI plus CI concentration effective to provide corrosion inhibition to a metal surface contacted with a water source, and a concentration of GQD-t-CI effective to provide a suitable emission spectrum for measuring the concentration thereof downstream from the applying of the concentrate to the water source. Methods of measuring concentration of the GQD-t-CI are described below.

Methods

In embodiments, a method of the invention includes applying a GQD-t-CI to a water source to form a tagged water source, and monitoring the applied GQD-t-CI concentration in the tagged water source by: irradiating the tagged water source with a selected source of light having a first range of wavelengths; and measuring the luminescent emission of the GQD-t-CI in a second range of wavelengths. In some embodiments, the measuring of the second range of wavelengths is a measuring of substantially a single wavelength. In some embodiments, the irradiating with a first range of wavelengths is irradiating with substantially a single wavelength.

In embodiments, the applying is to an injectate, wherein the tagged injectate is injected into one or more subterranean reservoirs and the measuring is accomplished upon collecting produced water containing the GQD-t-CI injected. In other embodiments, the applying is to a produced water and the measuring is accomplished at any point downstream of the applying. In embodiments, the irradiating and the measuring are contemporaneous. In embodiments, the irradiating and the measuring are done at the same physical location or in close physical proximity. In some embodiments, irradiating and measuring are carried out substantially continuously. In other embodiments, the irradiating and measuring are carried out at substantially regular intervals of about 1 second to 1 week. In still other embodiments, the irradiating and measuring are carried out irregularly, sporadically, randomly, or on-demand by an operator.

In some embodiments, the applying further includes applying CI to the tagged water source, either separately and at a targeted ratio with GQD-t-CI that is applied contemporaneously, or as a blend with GQD-t-CI as described above. In embodiments, the CI applied is a CI having substantially the same structure as the CI residue bonded to the GQD-t-CI. The CI is applied to the water source in a molar ratio of GQD-t-CI:CI of about $1:1\times10^{11}$ to 100:1. In some such embodiments, the ratio of GQD-t-CI:CI is further selected to apply at least about 0.1 ppb by weight of the GQD-t-CI to the water source. In some such embodiments, the ratio of GQD-t-CI:CI is selected to apply at least about 0.1 ppb by weight of the GQD-t-CI to the water source, further wherein the total weight of GQD-t-CI and CI applied to the water source is about 5 ppm to 5000 ppm by weight.

The emission spectrum of the GQD-t-CI, that is, the second range of wavelengths, is characteristic of the GQD-t-CI when excited by the irradiation with the selected first range of wavelengths. In some embodiments, the excitation of the GQD-t-CI in the tagged water source further causes the residual hydrocarbon products present as entrained therein to luminesce over a third range of wavelengths, wherein the third range of wavelengths is not measured, or is excluded by the measurement technique employed to measure the second range of wavelengths.

The irradiating and the measuring may be in real time, in near-real time, or in offline/batch mode. In embodiments, the irradiating and the measuring is accomplished in situ, for example irradiating and measuring a dynamic flow within a pipe (real time), or irradiating and measuring of a stream diverted from a flow within a pipe (near real time), or irradiating and measuring a periodic collection of the output at the end of a pipe (batch mode). Near-real time measuring is where there is a 1 second to 1 minute delay between the diverting of the water source and the irradiating/measurement; such measurements are made, for example, by diverting water source flows and measuring the diverted water source 1 second to 1 minute after the point of diversion.

In some embodiments, measuring of the second range of wavelengths is a measuring of substantially a single wavelength. In some embodiments, the irradiating with a first range of wavelengths is irradiating with substantially a single wavelength.

Methods of measuring emitted radiation at the selected wavelengths between about 500 nm and 700 nm is well understood throughout the industry and conventional measurement methods and equipment are applied to accomplish the measuring. The intensity of the second range of wavelengths measured is directly correlated to the concentration of GQD-t-CI. In turn, the concentration of GQD-t-CI directly correlates to the concentration of CI since the ratio of the two materials applied to the water source remains constant. In this manner, real-time monitoring of CI concentration is made possible without interference from the background emissions of residual hydrocarbons and without the necessity of carrying out lengthy and expensive methods such as liquid chromatography which does not allow for real-time monitoring.

The irradiating and measuring allow for rapid and accurate real-time determination of CI concentration, allowing for on-the-fly adjustments in CI concentration and optimization of CI levels to maintain a substantially targeted CI concentration within a pipeline or elsewhere within the equipment used to contact produced water, or more generally with regard to any metal surface contacted by produced water.

Corrosion in metal pipelines and surrounding infrastructure and equipment (collectively, "metal containments") is problematic where a metal vulnerable to corrosion is contacted with produced water. Produced water is one or more of hard, saline, or brackish; connate and sea water both contain high concentrations, up to about 30 wt %, of total dissolved solids the bulk of which are salts. The salts lead to corrosion of the metal pipes and any other metal infrastructure contacted by the produced water is a key need of the oil recovery industry. Metals commonly contacted with produced water include carbon steel, stainless steel and a range of corrosion resistant alloys (CRAs). As field systems for hydrocarbon recovery are set up differently depending on the recovery process and surrounding environment, the point of applying and timing of the applying of the CI differs depending on the operator and the specific field setup. One of skill will understand that the methods of the invention are not limited in any way by the timing or location of the applying. Typically, the GQD-t-CI is applied at the same time and at the same point as the application of the CI and is accomplished by mixing the CI and the GQD-t-CI, optionally along with one or more additional additives or adjuvants as described above, and applying the mixture into the injectate or into the produced water. The applying is accomplished in any one or more of the conventional methods used to apply CI formulations to metal containments for carrying injectate or produced water, as will be understood by one of skill.

In some embodiments the GQD-t-CI is applied to the water source as injectate, where the injectate is injected into a subterranean reservoir and later re-collected as produced water after one or more hydrocarbon recovery operations such as hydraulic fracturing or tertiary oil recovery. In other embodiments, the GQD-t-CI is applied to a produced water before or after bulk separation thereof from the crude oil products initially collected during the one or more hydrocarbon recovery operations. The applying of the GQD-t-CI, typically though not always as a mixture with CI, is carried out at any location and in any manner suitable to provide corrosion inhibition to one or more metal containments contacted with produced water.

The presence of the GQD-t-CI in produced water allows for rapid optimization of CI species concentration, or dosage, in the field. The methods of the invention allow field operators to maintain real-time monitoring of CI concentration, thereby greatly slowing the onset or progress of corrosion of pipelines and other metal equipment—particularly carbon steel pipelines—employed in oil recovery processes to transport produced water.

EXPERIMENTAL SECTION

Example 1

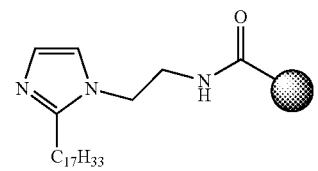

The compound shown above was synthesized according to techniques set forth in B. Neises, W. Steglich, *Angew. Chem. Int. Ed.*, 1978, 17, 522-524. To a mixture of carboxylic acid functional Graphene Quantum Dot (GQD) (25 mg) and N,N-dimethyl-4-aminopyridine (1.3 mg, 0.01 mmol) in 0.5 mL of dimethyl formamide chilled in an ice-water bath, was added dicyclohexyl carbodiimide (9.06 mg, 0.04 mmol) in one portion. The mixture was stirred for 10 min, and then the ice bath was removed. The primary amino precursor compound corresponding to the structure above, 2-(2-heptadecyl)1H-imidazol-1-yl)ethan-1-amine:

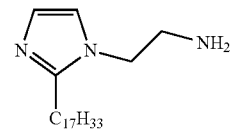

was added (28 mg, 0.04 mmol), and the mixture stirred at ambient temperature for 2 h. Then 2.5 mL deionized (DI) water was added to the mixture; then the mixture was centrifuged and washed with 1 mL of DI water twice. The solid particles obtained from the centrifugation were resuspended in 3 mL DI water with 1 drop of acetic acid.

Then 40 uL of the above solution was irradiated at a wavelength of 475 nm and the emission maximum was observed at 515 nm.

Example 2

The synthesis of Example 1 was repeated, except replacing 2-(2-heptadecyl)1H-imidazol-1-yl)ethan-1-amine with an equimolar amount (28 mg, 0.04 mmol) of the primary alcohol analog of the amino compound: 2-(2-heptadecyl) 1H-imidazol-1-yl)ethan-1-ol. Then 40 uL of the resulting solution was irradiated at a wavelength of 475 nm; the emission maximum was observed at 515 nm.

Example 3

A tall oil (C16-C18) adduct of diethylenetriamine imidazoline (TOFA-DETA) was reacted with a carboxylic acid-functional GQD using the technique of Example 1 to form GQD-t-TOFA/DETA. TOFA/DETA is a material conventionally employed to prevent corrosion in metal pipes carrying aqueous industrial processing streams.

Corrosion bubble cell tests were performed using the general procedure set forth in Andreev, N. et al., *J. Corros. Scale Inhib.* 2013, 2(1), 17-19. Conditions used were C1018 carbon steel electrode; 80° C.; $CO_2$ saturated aqueous dispersion including 3 wt % NaCl and 20 wt % of a hydrocarbon mixture (75 wt % LVT 200 hydrotreated light distillate, 25 wt % xylene); continuous $CO_2$ sparge; and atmospheric pressure. The brine/hydrocarbon mixture was first allowed to contact the C1018 carbon steel electrode for about 3 hours before adding the corrosion inhibitor to be tested. The testing was carried out on three samples by injecting a material into the heated brine/hydrocarbon mixture; all recited injection amounts are based on the weight of the water in the test cell.

In Example 3A, the GQD-t-TOFA/DETA synthesized above was injected into the heated brine/hydrocarbon mixture in an amount corresponding to the equivalent of 2 ppm TOFA/DETA functionality; 0.2 ppm 2-mercaptoethanol was injected along with the GQD-t-TOFA/DETA. In Example 3B, 2 ppm TOFA/DETA and 0.2 ppm 2-mercaptoethanol were injected into the heated brine/hydrocarbon mixture. In Example 3C, no materials were injected (Control).

Figure 7:
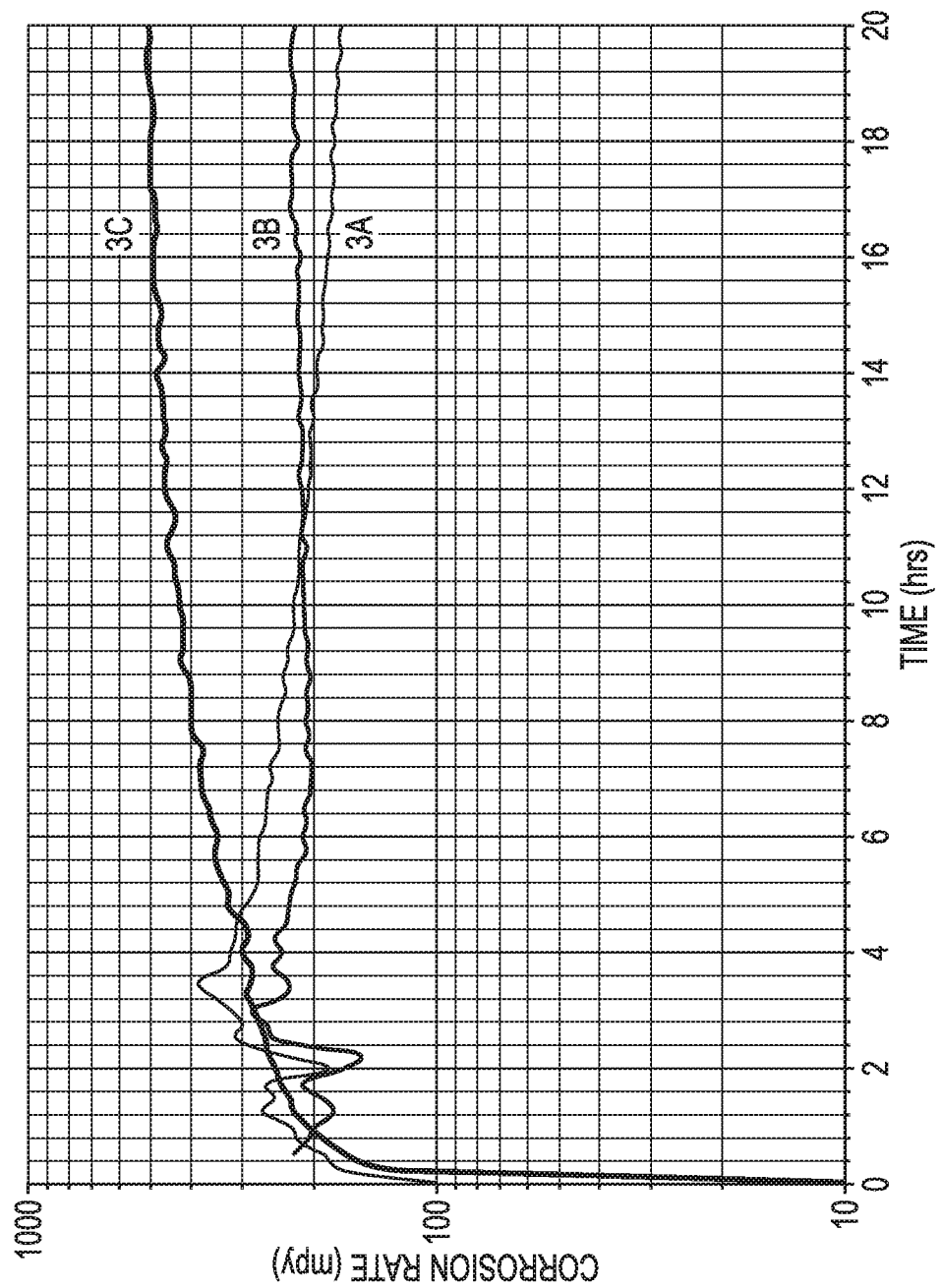
FIG. 7 is a plot showing rate of corrosion as a function of time for a combination of corrosion inhibitor plus a corrosion inhibitor tagged graphene quantum dot.

All three tests were allowed to proceed for a period of about 20 hours while corrosion was continuously measured. Corrosion rate (mpy) as a function of time is shown for 3A, 3B, and 3C in FIG. 7. Comparison of the Control Example 3C with Examples 3A and 3B in a snapshot at 15 hours into this test revealed that the corrosion rate of the carbon steel was reduced from about 300 mpy to about 180 mpy in Example 3A, and was similarly reduced to about 220 mpy in Example 3B. This shows that the GQD bonded to the corrosion inhibitor compound does not negatively impact the corrosion inhibition performance of the corrosion inhibitor functionality.

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

What is claimed is:

1. A composition comprising a mixture of:
    a corrosion inhibiting compound; and
    a graphene quantum dot having a particle size of about 2 nm to 20 nm and comprising an amount of the corrosion inhibiting compound covalently bonded to an edge of the graphene quantum dot.

2. The tagged corrosion inhibitor composition of claim 1 wherein the corrosion inhibiting compound comprises one or more imidazoline, ammonium, alkylpyridine, phosphate ester, or thiol groups.

3. The tagged corrosion inhibitor composition of claim 1 wherein the corrosion inhibiting compound is mercaptoethanol.

4. The tagged corrosion inhibitor composition of claim 1 wherein the covalent bonding comprises a carboxyl or carboxamide group bonded to the graphene quantum dot and to the corrosion inhibiting compound.

5. The tagged corrosion inhibitor composition of claim 1 wherein the composition luminesces at a wavelength of about 600 nm to 700 nm when excited by light having a wavelength of about 500 nm.

6. The tagged corrosion inhibitor composition of claim 1 wherein the particle size of the graphene quantum dot is about 2 nm to 10 nm.

7. The tagged corrosion inhibitor composition of claim 1 wherein the mixture is effective to provide corrosion inhibition to a metal surface contacted with a water source.

8. The tagged corrosion inhibitor composition of claim 1 further comprising a solvent.

9. A composition comprising a mixture of:
    a produced water;
    a corrosion inhibiting compound; and
    a graphene quantum dot having a particle size of about 2 nm to 20 nm and having an amount of the corrosion inhibiting compound covalently bonded to an edge thereof.

10. The composition of claim 9 wherein the produced water comprises about 0.001 wt % to 95 wt % entrained hydrocarbon.

11. The composition of claim 1 wherein the weight ratio of the graphene quantum dot having the corrosion inhibiting compound bonded thereto to the corrosion inhibiting compound is about 1:1 to $1:1 \times 10^4$.

* * * * *